United States Patent
Barion

(10) Patent No.: US 12,384,905 B2
(45) Date of Patent: Aug. 12, 2025

(54) MULTI-LAYER CONTAINERS

(71) Applicant: Greif International Holding B.V., Amstelveen (NL)

(72) Inventor: Guido Barion, Sorisole (IT)

(73) Assignee: Greif International Holding B.V., Amstelveen (NL)

( * ) Notice: Subject to any disclaimer, the term of this patent is extended or adjusted under 35 U.S.C. 154(b) by 0 days.

(21) Appl. No.: 15/659,052

(22) Filed: Jul. 25, 2017

(65) Prior Publication Data
US 2018/0030253 A1  Feb. 1, 2018

(30) Foreign Application Priority Data
Jul. 27, 2016 (EP) ..................... 16181546

(51) Int. Cl.
| | |
|---|---|
| B32B 1/02 | (2006.01) |
| B29C 49/22 | (2006.01) |
| B29C 49/42 | (2006.01) |
| B32B 7/10 | (2006.01) |
| B32B 27/08 | (2006.01) |
| B32B 27/18 | (2006.01) |
| B32B 27/32 | (2006.01) |
| B32B 27/34 | (2006.01) |
| B65D 1/02 | (2006.01) |
| C08L 23/04 | (2006.01) |
| C08L 23/06 | (2006.01) |
| B29C 49/04 | (2006.01) |
| B29K 23/00 | (2006.01) |
| B29L 31/00 | (2006.01) |

(52) U.S. Cl.
CPC .............. *C08L 23/06* (2013.01); *B29C 49/22* (2013.01); *B29C 49/4278* (2013.01); *B29C 49/4284* (2013.01); *B32B 7/10* (2013.01); *B32B 27/08* (2013.01); *B32B 27/18* (2013.01); *B32B 27/32* (2013.01); *B32B 27/34* (2013.01); *B65D 1/0215* (2013.01); *C08L 23/04* (2013.01); *B29C 49/04* (2013.01); *B29K 2023/08* (2013.01); *B29L 2031/712* (2013.01); *B32B 2250/03* (2013.01); *B32B 2250/242* (2013.01); *B32B 2250/40* (2013.01); *B32B 2270/00* (2013.01); *B32B 2272/00* (2013.01); *B32B 2307/21* (2013.01); *B32B 2307/558* (2013.01); *B32B 2307/714* (2013.01); *B32B 2307/7242* (2013.01); *B32B 2439/40* (2013.01); *C08L 2201/04* (2013.01); *C08L 2203/16* (2013.01); *C08L 2205/03* (2013.01); *C08L 2205/035* (2013.01); *C08L 2205/08* (2013.01); *C08L 2207/062* (2013.01); *C08L 2207/20* (2013.01); *Y02P 70/10* (2015.11)

(58) Field of Classification Search
CPC ........... B32B 1/02; B32B 27/32; B32B 27/34; Y10T 428/1352; Y10T 428/31746; Y10T 428/31855; Y10T 428/31725; B65D 88/00
USPC .............. 428/476.1, 35.7, 474.4, 500, 62.22; 220/62.22
See application file for complete search history.

(56) References Cited

U.S. PATENT DOCUMENTS

| | | | | |
|---|---|---|---|---|
| 4,321,158 | A * | 3/1982 | Beall | G21F 9/24 405/129.35 |
| 6,033,749 | A * | 3/2000 | Hata | B32B 27/08 206/524.1 |
| 6,068,934 | A | 5/2000 | Vandekerckhove et al. | |
| 2003/0198406 | A1* | 10/2003 | Bibbo | B01F 13/065 383/41 |
| 2006/0270799 | A1 | 11/2006 | Sato et al. | |
| 2007/0092674 | A1* | 4/2007 | Gutwillig | B32B 27/00 428/35.7 |
| 2008/0014390 | A1* | 1/2008 | Scott | B32B 27/08 428/35.7 |
| 2009/0324866 | A1* | 12/2009 | Bocker | B29C 51/267 264/529 |
| 2012/0108694 | A1* | 5/2012 | Malet | C08G 69/40 264/234 |
| 2013/0143014 | A1* | 6/2013 | Kawasumi | D02G 3/02 428/213 |
| 2014/0248487 | A1* | 9/2014 | Sugimoto | B32B 27/36 428/323 |

FOREIGN PATENT DOCUMENTS

| | | |
|---|---|---|
| CN | 102492210 A | 6/2012 |
| EP | 1752492 A1 | 2/2007 |

(Continued)

OTHER PUBLICATIONS

Matweb LyondellBassell Lupolen, 1996-2023.*

(Continued)

*Primary Examiner* — Marc A Patterson
(74) *Attorney, Agent, or Firm* — Erik J. Overberger; Rankin Hill & Clark, LLP

(57) ABSTRACT

A multi-layer container may include: a barrier layer made of polymer blend composition and at least one further layer including high density polyethylene. The polymer blend composition may include: 78-92% by weight of a homopolymer or copolymer of ethylene; 3-10% by weight of a polyamide homopolymer; 5-10% by weight of maleic anhydride grafted polyethylene; and 0-2% by weight of a first antistatic compound on a total weight of the polymer blend composition, in combination with first additives. The multi-layer container may have a thickness greater than or equal to 1.5 millimeters (mm) and less than or equal to 2.5 mm, a volume greater than or equal to 800 liters and less than or equal to 1,200 liters, or both.

19 Claims, No Drawings

(56) References Cited

FOREIGN PATENT DOCUMENTS

| EP | 2112201 A1 | 10/2009 |
|---|---|---|
| EP | 1748888 B1 | 8/2010 |
| RU | 2264917 C2 | 11/2005 |
| RU | 2324712 C2 | 5/2008 |
| WO | 02/079318 A2 | 10/2002 |
| WO | 2006/060285 A2 | 6/2006 |
| WO | 2007/070967 A1 | 6/2007 |
| WO | 2005/115748 A1 | 12/2008 |
| WO | WO 2017/021389 A1 | 2/2017 |

OTHER PUBLICATIONS

Matweb EMS—Grivory Grilon F50, 1996-2023.*
Marlex Technical Data Sheet, 2011.*
Sherman, Plasticsn Technolgy, 2001.*
DuPont Fusabond MB100D, 2008-2015.*
European Search Report dated Jan. 13, 2017, in corresponding European Application No. EP 16181546.9, 5 pages.

* cited by examiner

MULTI-LAYER CONTAINERS

CROSS-REFERENCE TO RELATED APPLICATION(S)

This application claims priority under 35 U.S.C. § 119 from European Patent Application No. 16181546.9, filed on Jul. 27, 2016, in the European Patent Office ("EPO"), the entire contents of which are incorporated herein by reference.

FIELD OF THE INVENTION

The present invention relates to the fields of polymer blend compositions and plastic containers for the transport of hazardous substances, made of the same.

More particularly relates to high-impact resistance containers, having improved barrier properties.

The present invention further relates to multi-layer containers comprising at least one layer made of said polymer blend composition, and the method for producing the same.

DESCRIPTION OF THE PRIOR ART

Plastic containers for the transport of hazardous substances need to display three major technical features to be considered suitable for said purpose:
- Structural strength, in order to prevent environmental dispersion of the content of the plastic container;
- Chemical resistance, in order not to be chemically damaged by the stored good;
- Barrier properties, to preserve the physico-chemical features of the stored sub stance.

High Density Polyethylene (HDPE) is one of the most common polymer employed for the production of hazardous substances-containers, providing for good mechanical properties, but not always providing for the desired barrier properties. For hazardous substances having a flash point ≤60° C. indeed, the barrier proprieties given by HDPE are generally insufficient, and other materials need to be combined with the polyolefine in order to produce an efficient plastic container.

At the present time, several are the technologies known to the state of the art for the provision of a high barrier HDPE container for the collection of hazardous substances.

In EP 1748888 an in situ multi-layer co-extrusion blow moulding is described, providing for a bi-layered container comprising an outer and an inner layer.

Said inner layer comprises a polyamide homopolymer and a maleic anhydride grafted polyethylene (MAgPE) coupling agent, while said outer layer comprises HDPE, a maleic anhydride grafted polyethylene coupling agent and the regrind material obtained from the leftover of said outer and inner layers.

EP 1752492 discloses a thermoplastic resin composition, and the thermoplastic resin articles thereof, comprising a modified polyolefine, a barrier resin and a polyolefine, wherein said barrier resin and said polyolefine have a specific melt viscosity ratio ranging between 0.7 and 2.5, when said melting viscosities are measured at a shear rate of 100 Hz and at a temperature ranging between MP+2° C.–MP+10° C., with MP being the melting point of said barrier resin.

EP 1752492 further describes thermoplastic resin articles comprising a layer made of the thermoplastic resin composition mentioned above.

There is the need to find a technology suitable for the production of high-volume plastic containers for the transport of hazardous substances, providing for high barrier properties and high impact and chemical-resistance.

SUMMARY OF THE INVENTION

An object of the invention is to provide a polymer blend composition suitable for the production of high-volume multi-layer containers, displaying excellent barrier properties, chemical and impact resistance, when compared to the containers of the prior art.

A further object of the present invention is to provide a simple economic process for the manufacture of plastic containers, easily applicable to commercial materials and valid blow moulding machines, without the need of high cost modifications of production plants.

It is an additional object of the present invention to provide multi-layer containers comprising one layer made of said polymer blend composition, that are cost-effective and easy to produce.

The production of a multi-layer HDPE container with implemented barrier properties is not new to the state of the art, but it has never been accomplished as simply as the process proposed with the present invention.

DETAILED DESCRIPTION OF THE INVENTION

Multi-Layer Container

The object of the present invention is a polymer blend composition comprising 78-92% by weight of a homopolymer or copolymer of ethylene, 3-10% by weight of a polyamide homopolymer, 5-10% by weight of maleic anhydride grafted polyethylene (MAgPE) and 0-2% by weight of antistatic compound on the total weight of the polymer blend composition, in combination with suitable additives. The homopolymer or copolymer of ethylene is preferably a high density polyethylene.

Said high density polyethylene employed for the aim of the present invention has a density ranging preferably between 0.945-0.955 $g/cm^3$.

Even more preferably said high density polyethylene is selected from the group consisting of high density polyethylene homopolymers, high density ethylene/hexene copolymers or mixtures thereof.

Suitable high density polyethylene polymers are even more preferably characterised by:
- a melt flow index ranging between 2-12 g/10 min at 190° C./21.6 kg,
- a yield strength ranging between 23-28 MPa when stretched at 50 mm/min, at 23° C. (ISO 527-1-2)
- an elongation ranging between 500-700% (ISO 527-2) at break,
- a flexural modulus ranging between 850-1300 MPa
- an environmental stress cracking greater than 500 hours, preferably between 1000 and 2000 hours (ASTM D1693)

Suitable high density polyethylene that can be used within the aim of the present invention are those available on the market with the commercial name of Lupolen 4261 AGUV 60005 (Basell Polyolefines), Rigidex® HM4560UA (Ineos Polyolefins), Polyethylene HDPE 49080 UV (Total petrochemicals).

The polyamide homopolymer used in the polymer blend composition of the present invention is preferably polyamide 6.

Within the scope of the present invention, suitable polyamide 6 are more preferably characterised by:
- a density ranging between 1.12 and 1.16 g/cm$^3$,
- a notched impact strength ranging between 5 and 7 KJ/m$^2$ Charpy at 23° C.,
- a melt volume flow rate ranging between 43 and 47 cm$^3$/10 min at 275° C./21.6 kg,
- a melting point ranging between 220 and 224° C.,
- a moisture content ranging between 0.03% and 0.1%.

Within the purposes of the present invention, a suitable polyamide 6 polymer is for example the one available on the market with the commercial name of Grilon F 50 nat 6368 (EMS-GRIVORY|a unit of EMS-CHEMIE AG).

The polymer blend composition of the present invention further comprises Maleic Anhydride grafted Polyethylene (MAgPE), a modified polyethylene, functionalised with the anhydride of the unsaturated carboxylic maleic acid.

In a preferred embodiment, the MAgPE suitable for the polymer blend composition of the present invention has a density ranging between 0.958-0.962 g/cm$^3$, a melt flow rate ranging between 1-3 g/10 min at 190° C./2.16 kg, a melting point ranging between 130-137° C., and a maleic anhydride graft level ranging between 0.9-1.2% by weight on the total weight of the MAgPE.

Within the aim of the present invention, a suitable MAgPE is the one available in the market with the commercial name of DuPont™ Fusabond® E MB100D (Dupont Packaging & Industrial Polymer).

An antistatic compound is furthermore contained in the polymer blend composition according to the present invention.

As used within the context of the present invention, an antistatic compound is defined as a material having a resistance R$_0$ comprised between $10^5\Omega < R_0 < 10^{12}\Omega$.

Suitable antistatics employed within purposes of the present invention are most preferably selected from the group consisting of polyamide-polyether block amide mixtures.

In general sense a polyether block amide (polyetheresteramide) or PEBA is a block copolymer obtained by polycondensation of a carboxylic acid polyamide (PA6, PA11, PA12) with polyoxyalkylene glycol (Polytetramethylene glycol PTMG; PEG).

PEBA is a high performance thermoplastic elastomer, displaying lower density among TPE, superior mechanical and dynamic properties (flexibility, impact resistance, energy return, fatigue resistance) as well as being able to keep these properties at low temperature (lower than −40° C.).

Polyamide/polyether block amide mixtures are polymeric systems comprising polyamide and said thermoplastic PEBA elastomers.

Among the preferred polyamide/polyether block amide mixtures, most preferably the one employed in the purpose of the present invention is the polymeric system known with the trade name of IRGASTAT® P18, produced from Ciba Specialty Chemicals, and providing for a permanent antistatic effect.

In another preferred embodiment, the polymer blend composition disclosed in the present application can eventually comprise other additives, such as colour, UV protection-agents (antiUV), compatibilisers, nucleation agents.

The aforementioned polymer blend composition, in view of the specific selection of components and concentrations, allows the production of plastic containers for the transport of hazardous substances displaying superior barrier properties, chemical and impact resistance when compared to the plastic containers of the state of the art.

Within the scope of the present invention, by hazardous substance is meant any of the substances belonging to classes 3-6, 8-9 provided by "The Recommendations on the Transport of Dangerous Goods", said classes corresponding respectively to Flammable Liquids; Flammable solids, substances liable to spontaneous combustion, substances which, on contact with water, emit flammable gases;

Oxidizing substances and organic peroxides; Toxic and Infectious substances; Corrosive substances; Miscellaneous dangerous substances and articles, including environmentally hazardous substances. (http://www.unece.org/fileadmin/DAM/trans/danger/publi/unrec/rev19/Rev19e_Vol_I.pdf).

The polymer blend composition of the present invention is employed to manufacture inner containers for Intermediate Bulk Containers (IBC) for storage and collection of liquid or gel hazardous substances.

The polymer blend composition of the present invention is particularly advantageous for the production of plastic containers suitable for example for the storage and collection of petroleum-based products, aromatic solvents, aliphatic solvents, ketones, kerosenes, alcohols and commercially based products such as paints, pesticides and herbicides that are dissolved in such solvents.

The present invention also relates to a multi-layer container comprising a barrier layer made of the polymer blend composition according to the present invention and at least one further layer comprising HDPE.

Advantageously, the barrier layer according to the present invention provides good barrier properties for hydrocarbon materials even more preferably against the following test materials: Trichloroethylene (Flash Point (FP) 89.6 degC), Cyclohexanone (FP 44 degC), Hexane (FP −26 degC), Propanol (FP 22 degC)) & Xylene (FP 30 degC).

Even more preferably, said at least one further layer contains 70-100% by weight of HDPE, 0-20% by weight of an antistatic compound, 0-10% by weight of additives, said additives being preferably selected among compatibilisers, colours and antiUV.

In a first preferred embodiment, the multi-layer container according to the present invention is constituted by three layers: the barrier layer made of the polymer blend composition according to the present invention; a first layer made of HDPE; a second layer made of HDPE.

The three layers comprise an inner layer, an outer layer and an intermediate layer arranged between the inner layer and the outer layer. The inner layer is designed to contact the hazardous substance stored in the multi-layer container.

In said first preferred embodiment, said first layer is the inner layer, said second layer is the outer layer, and said barrier layer is the intermediate layer, arranged between said first layer and second layer.

In a second preferred embodiment, the multi-layer container according to the present invention is constituted by three layers: the barrier layer made of the polymer blend composition according to the present invention; a first layer made of HDPE; a second layer comprising 70-90% by weight of HDPE, 5-20% by weight of an antistatic compound, preferably Irgastat® P18, and 1-10% by weight of additives, preferably 4% of compatibilizer, 1% antiUV and, optionally, a colour masterbatch.

Even more preferably said compatibilizer is Lotader AX 8900.

In said second preferred embodiment, said first layer is the inner layer, said second layer is the outer layer and said barrier layer is the intermediate layer, arranged between the first and the second layers.

Advantageously, the presence of MAgPE in the polymer blend composition according to the present invention provides for a good adhesion between the three layers, without the need to introducing an additional adhesive layer.

Even more preferably, said barrier layer of said multi-layer container comprises 0-40% by weight of regrinded material from said barrier layer and from said at least one further layer.

More precisely, according to a preferred embodiment, said barrier layer comprises 0-40% by weight of regrinded material from said barrier layer, said first layer and said second layer.

Whether present, said antistatic compound comprised within said at least one further layer is preferably the same antistatic compound comprised in the polymer blend composition according to the present invention.

The multi-layer container according to the present invention preferably has a volume ranging between 800 L and 1200 L, in view of the aforementioned volumes, a total weight ranging between 14 kg and 21 kg, wherein the outer layer has a weight preferably ranging between 2 kg and 3 kg, the inner and intermediate layers have, singularly, a weight preferably ranging between 6 kg and 9 kg.

Another object of the present invention is a method for producing the multi-layer container, according to the present invention, said method comprising the steps of:
  i. Dry blending an homopolymer or copolymer of ethylene, a polyamide and maleic anhydride grafted polyethylene;
  ii. Melting the dry blended polymer mass according step i. in an extruder;
  iii. Coextruding said dry blended polymer mass together with at least one further layer comprising HDPE, to form a multi-layer parison;
  iv. Blowing the multi-layer parison in a mold to obtain a multi-layer container;
  v. Trimming the leftover material of the multi-layer parison extending beyond the mold;
  vi. Recycling said leftover material into the following production cycle.

Preferably, the leftover material obtained from each production cycle of the aforementioned method is added to phase i. and dry blended together with the other polymers.

EXAMPLES OF MULTILAYER CONTAINER

With an explicative but not limitative purpose, we provide herewith two examples of the polymer blend composition employed for the production of the multi-layer container according to the present invention.

Example 1

Multi-layer container according to the present invention, characterised by a total weight of 17.5 kg, a volume of 1000 L and a thickness of 1.5 mm-2.5 mm.

| | Inner Layer (w/w) | Intermediate Layer (w/w) | Outer Layer (w/w) |
|---|---|---|---|
| Total % (w/w) | 42.5% | 42.5% | 15% |
| Grilon F 50 nat 6368 | 0.0% | 6.02% | 0.0% |
| DuPontTM Fusabond ® E MB100D | 0.0% | 8.43% | 0.0% |
| Irgastat P18 | 0.0% | 0.00% | 0.0% |
| Rigidex ® HM4560UA | 100.0% | 85.54% | 100.0% |

Example 2

Multi-layer container according to the present invention, characterised by a total weight of 17.5 kg, a volume of 1000 L and a thickness of 1.5 mm-2.5 mm.

| | Inner Layer (w/w) | Intermediate Layer (w/w) | Outer Layer (w/w) |
|---|---|---|---|
| Total % (w/w) | 42.5% | 42.5% | 15% |
| Grilon F 50 nat 6368 | 0.0% | 6.02% | 0.0% |
| DuPontTM Fusabond ® E MB100D | 0.0% | 8.43% | 0.0% |
| Lotader AX 8900 | 0.0% | 0.36% | 5.0% |
| Irgastat P18 | 0.0% | 1.08% | 15.0% |
| BF UV 1610 | 0.0% | 0.07% | 1% |
| Rigidex ® HM4560UA | 100.0% | 84.00% | 79.0% |

Single-Layer Container

A further polymer blend composition, a single-layer container obtained from said polymer blend composition and a method for the production of the same, which do not form part of the present invention, are hereinafter described according to the following clauses:
  1. A polymer blend composition comprising 68-87% by weight of a homopolymer or copolymer of ethylene, 5-15% by weight of a polyamide homopolymer, 8-17% by weight of maleic anhydride grafted polyethylene (MAgPE), in combination with suitable additives.
  2. The polymer blend composition according to clause 1, wherein the homopolymer or copolymer of ethylene is a high density polyethylene having a density ranging between 0.945-0.955 g/cm$^3$.
  3. The polymer blend composition according to clause 2, wherein the high density polyethylene is selected from the group consisting of high density polyethylene homopolymers, high density polyethylene/hexene copolymers and mixtures thereof.
  4. The polymer blend composition according to anyone of clauses 1-3, wherein the polyamide homopolymer is polyamide 6.
  5. The polymer blend composition according to anyone of clauses 1-4, wherein said suitable additives are selected from the group consisting of antistatics, UV protection-agents, compatibilisers, nucleation agenta, colours.
  6. A single-layer container consisting of one layer made of the polymer blend composition according to anyone of clauses 1 to 4.
  7. The single-layer container according to clause 6, wherein said single-layer container comprises 0-40% of regrinded material from said one layer.

It is described herewith a polymer blend composition not belonging to the present invention and comprising 68-87% by weight of a homopolymer or copolymer of ethylene, 5-15% by weight of a polyamide homopolymer, 8-17% by weight of maleic anhydride grafted polyethylene (MAgPE), in combination with suitable additives.

The homopolymer or copolymer of ethylene is preferably a high density polyethylene. Said high density polyethylene has a density preferably ranging between 0.945-0.955 g/cm$^3$.

Even more preferably said high density polyethylene is selected from the group consisting of high density polyethylene homopolymers, high density ethylene/hexene copolymers or mixtures thereof.

Suitable high density polyethylene hydrocarbon polymers are even more preferably characterised by:
- a melt flow index ranging between 2-12 g/10 min at 190° C./21.6 kg,
- a yield strength ranging between 23-28 MPa when stretched at 50 mm/min, at 23° C. (ISO 527-1-2)
- an elongation ranging between 500-700% (ISO 527-2) at break,
- a flexural modulus ranging between 850-1300 MPa
- an environmental stress cracking greater than 500 hours, preferably between 1000 and 2000 hours.

Suitable homopolymer or copolymer of ethylene that can be used for the polymer blend are those available on the market with the commercial name Lupolen 5261 Z (Basell Polyolefines), Marlex® HXM 50100 (Chevron Philips Chemical Company), HDPE 56020 S (Total refining & Chemicals), RIGIDEX® HM5420XPH (INEOS Olefines and Polymers Europe), Polyethylene HDPE 49080 UV (Total petrochemicals).

The polyamide homopolymer used in the aforementioned polymer blend is preferably polyamide 6.

Suitable polyamide 6 suitable for the polymer blend composition are more preferably characterised by:
- a density ranging between 1.12 and 1.16 g/cm$^3$,
- a notched impact strength ranging between 5 and 7 KJ/m$^2$ Charpy at 23° C.,
- a melt volume flow rate ranging between 43 and 47 cm$^3$/10 min at 275° C./21.6 kg,
- a melting point ranging between 220 and 224° C.,
- a moisture content ranging between 0.03% and 0.1%.

More preferably, suitable polyamide 6 is for example the one available on the market under the trade name of Grilon F 50 nat 6368 (EMS-GRIVORY|a unit of EMS-CHEMIE AG).

The polymer blend composition further comprises Maleic Anhydride grafted Polyethylene (MAgPE), a modified polyethylene, functionalised with the anhydride of the unsaturated carboxylic maleic acid.

In a preferred embodiment, the MAgPE suitable for the polymer blend composition of the present invention has a density ranging between 0.958-0.962 g/cm$^3$, a melt flow rate ranging between 1-3 g/10 min at 190° C./2.16 kg, a melting point ranging between 130-137° C., and a maleic anhydride graft level ranging between 0.9-1.2% by weight on the total weight of the MAgPE.

A suitable MAgPE is for example the one available in the market under the commercial name of DuPont™ Fusabond® E MB100D (Dupont Packaging & Industrial Polymer).

In another preferred embodiment, the polymer blend composition can eventually comprise other additives, such as antistatics, colours, UV protection-agents (antiUV), compatibilisers, nucleation agents.

The aforementioned polymer blend composition, in view of the specific selection of components and concentrations, allows the production of plastic containers for the transport of hazardous substances displaying superior barrier properties, chemical and impact resistance when compared to the plastic containers of the state of the art.

The polymer blend composition is employed to manufacture monolayer containers, for storage and collection of liquid or gel hazardous substances.

The polymer blend composition is particularly advantageous for the production of plastic containers suitable for example for the storage and collection of petroleum-based products, aromatic solvents, aliphatic solvents, ketones, kerosenes, alcohols and commercially based products such as paints, pesticides and herbicides that are dissolved in such solvents.

Advantageously the barrier layer according to the present invention provides good barrier properties for hydrocarbon materials even more preferably against the following test materials: Trichloroethylene (Flash Point (FP) 89.6 degC), Cyclohexanone (FP 44 degC), Hexane (FP −26 degC), Propanol (FP 22 degC)) & Xylene (FP 30 degC).

A single-layer container consisting of one layer made of the above mentioned polymer blend composition, not according to the present invention, is also hereinafter disclosed.

The single-layer container preferably has a volume ranging between 1 L and 30 L and, in relation to the aforementioned volumes, a thickness ranging between 0.7 mm and 4.0 mm.

Said single-layer container is preferably produced by a method comprising the following steps:
a. Dry blending an homopolymer or copolymer of ethylene, a polyamide and maleic anhydride grafted polyethylene;
b. Melting the dry blended polymer mass according step i. in an extruder;
c. Extruding said dry blended polymer mass to form a single-layer parison;
d. Blowing the single-layer parison in a mold to obtain a single-layer container;
e. Trimming the leftover material of the single-layer parison container extending beyond the mold;
f. Recycling said leftover material into the following production cycle.

Preferably, the leftover material obtained from each production cycle of the aforementioned method is added to phase a. and dry blended together with the other polymers.

More precisely, according to a preferred embodiment, said single-layer container comprises 0-40% by weight of regrinded material from said one layer.

EXAMPLES OF MONOLAYER CONTAINER

With an explicative but not limitative purpose, we provide herewith two examples of the polymer blend composition employed for the production of the single-layer container not according to the present invention.

Example 1

Single-layer container not according to the present invention, characterised by a total weight of 15.5 kg, a volume of 1000 L and a thickness of 1.4-2.2 mm.

|  | Single-Layer container |
|---|---|
| Total % | 100% |
| Grilon F 50 nat 6368 | 5.00% |

-continued

| | Single-Layer container |
|---|---|
| DuPontTM Fusabond ® E MB100D | 8.33% |
| HDPE 49080 UV | 86.67% |

Example 2

Single-layer container not according to the present invention, characterised by a total weight of 270 g, a volume of 5 L and a thickness of 0.7-2.0 mm.

| | Single-Layer container |
|---|---|
| Total % | 100% |
| Grilon F 50 nat 6368 | 14.00% |
| DuPontTM Fusabond ® E MB100D | 16.00% |
| Marlex ® HXM 50100 | 70.00% |

The invention claimed is:

1. An extruded blow-molded multi-layer container comprising:
   an inner layer including a high density polyethylene polymer exhibiting:
      a melt flow index ranging between 2-12 g/10 min at 190° C./21.6 Kg,
      a yield strength ranging between 23-28 MPa when stretched at 50 mm/min, at 23° C.,
      an elongation ranging between 500-700%,
   an outer layer including 70%-90% by weight of a high density polyethylene polymer exhibiting:
      a melt flow index ranging between 2-12 g/10 min at 190° C./21.6 Kg,
      a yield strength ranging between 23-28 MPa when stretched at 50 mm/min, at 23° C.,
   a barrier layer disposed between the inner layer and the outer layer, the barrier layer including:
      78-92% by weight of a homopolymer or copolymer of ethylene,
      3-10% by weight of a polyamide homopolymer,
      5-10% by weight of maleic anhydride grafted polyethylene (MAgPE).

2. The multi-layer container of claim 1 wherein the high density polyethylene polymer of the inner layer further exhibits:
   a flexural modulus ranging between 850-1300 MPa.

3. The multi-layer container of claim 1 wherein the high density polyethylene polymer of the outer layer further exhibits:
   an elongation ranging between 500-700%.

4. The multi-layer container of claim 3 wherein the high density polyethylene polymer of the outer layer further exhibits:
   a flexural modulus ranging between 850-1300 MPa.

5. The multi-layer container of claim 1 wherein the outer layer further includes 5-20% by weight of an antistatic compound having a resistance $R_o$ greater than $10^5$ ohms and less than $10^{12}$ ohms.

6. The multi-layer container of claim 5 wherein the antistatic compound is a polyamide-polyether block amide mixture.

7. The multi-layer container of claim 1 wherein the homopolymer or copolymer of ethylene of the barrier layer is high density polyethylene having a density in a range of from 0.945-0.955 g/cm$^3$.

8. The multi-layer container of claim 1 wherein the homopolymer or copolymer of ethylene of the barrier layer is high density polyethylene that exhibits:
   a melt flow index ranging between 2-12 g/10 min at 190° C./21.6 Kg, and
   a yield strength ranging between 23-28 MPa when stretched at 50 mm/min, at 23° C.

9. The multi-layer container of claim 8 wherein the high density polyethylene of the barrier layer further exhibits:
   an elongation ranging between 500-700%.

10. The multi-layer container of claim 9 wherein the high density polyethylene of the barrier layer further exhibits:
    a flexural modulus ranging between 850-1300 MPa.

11. The multi-layer container of claim 1 wherein the barrier layer further includes an antistatic compound.

12. The multi-layer container of claim 11 wherein the antistatic compound of the barrier layer exhibits a resistance $R_o$ greater than $10^5$ ohms and less than $10^{12}$ ohms.

13. The multi-layer container of claim 11 wherein the antistatic compound of the barrier layer is a polyamide-polyether block amide mixture.

14. The multi-layer container of claim 1 wherein the polyamide homopolymer is polyamide 6.

15. The multi-layer container of claim 14 wherein the polyamide 6 exhibits:
    a density ranging between 1.12 and 1.16 g/cm$^3$,
    a notched impact strength ranging between 5 and 7 KJ/m$^2$ Charpy at 23° C.

16. The multi-layer container of claim 14 wherein the polyamide 6 exhibits:
    a melt volume flow rate ranging between 43 and 47 cm$^{3/10}$ min at 275° C./21.6 Kg.

17. The multi-layer container of claim 14 wherein the polyamide 6 exhibits:
    a melting point ranging between 22° and 224° C.

18. The multi-layer container of claim 1 wherein the maleic anhydride grafted polyethylene (MAgPE) exhibits:
    a density ranging between 0.958-0.967 g/cm$^3$,
    a melt flow rate ranging between 1-3 g/10 min at 190° C./2.16 Kg.

19. The multi-layer container of claim 1 wherein the maleic anhydride grafted polyethylene (MAgPE) exhibits:
    a melting point ranging between 130-137° C.

\* \* \* \* \*